United States Patent [19]

Ohya et al.

[11] Patent Number: 4,972,764

[45] Date of Patent: Nov. 27, 1990

[54] COMBINATION OF SLIDING MEMBERS

[75] Inventors: Tadashi Ohya; Atsushi Takai, both of Saitama, Japan

[73] Assignee: Honda Giken Kogyo Kabushiki Kaisha, Tokyo, Japan

[21] Appl. No.: 418,309

[22] Filed: Oct. 6, 1989

[30] Foreign Application Priority Data

Oct. 7, 1988 [JP] Japan .................................. 63-253054

[51] Int. Cl.[5] .......................... F01B 11/02; F16J 10/00
[52] U.S. Cl. ..................................... 92/170.1; 92/248;
 92/169.1; 277/96.2; 277/DIG. 6; 384/300;
 384/908; 384/910; 384/911; 384/912; 384/913;
 428/422; 428/463
[58] Field of Search ..................... 92/248, 169.1, 170.1;
 384/300, 908, 912, 913, 911, 910; 277/96.2,
 DIG. 6; 428/422, 463

[56] References Cited

U.S. PATENT DOCUMENTS

| | | | |
|---|---|---|---|
| 4,123,122 | 10/1978 | Gabrielson et al. | 384/300 |
| 4,163,825 | 8/1979 | Wimmer | 384/300 |
| 4,277,118 | 7/1981 | McCloskey | 384/300 |
| 4,423,097 | 12/1983 | Mons et al. | 277/96.2 |
| 4,439,484 | 3/1984 | Mori | 428/422 |
| 4,443,517 | 4/1984 | Shah | 277/DIG. 6 |
| 4,453,988 | 6/1984 | Slater et al. | 428/463 |
| 4,818,618 | 4/1989 | Okazaki et al. | 428/463 |
| 4,847,135 | 7/1989 | Braus et al. | 428/422 |

FOREIGN PATENT DOCUMENTS 732108  6/1955  United Kingdom ................ 384/300

Primary Examiner—Edward K. Look
Assistant Examiner—Thomas Denion
Attorney, Agent, or Firm—Armstrong, Nikaido, Marmelstein, Kubovcik & Murray

[57] ABSTRACT

In a combination of sliding members which are suitable for use in the compressor for an automotive air conditioner, one of the members consists of an aluminum alloy which contains silicone particles consisting solely of eutectic silicon; and the other sliding member consists of a fluoride resin which contains carbon fibers and a calcium compound. The surface of the aluminum alloy can be finished to a desired smoothness as it does not contain any excessively hard substance. Also, since a calcium compound which is intermediate between carbon fibers and teflon resin in hardness is distributed in the teflon resin, the tendency of the carbon fibers to attack the aluminum alloy is reduced, and the aluminum alloy can achieve a sufficient wear resistance even though it does not contain any primary crystal silicon particles having a high hardness. Furthermore, the calcium compound serves as a lubricant, and reduces friction between the two sliding members.

5 Claims, 1 Drawing Sheet

COMBINATION OF SLIDING MEMBERS

TECHNICAL FIELD

The present invention relates to a combination of mutually sliding members, and in particular to such a combination of sliding members which involves relatively small friction between the two sliding members and offers a favorable durability against wears.

BACKGROUND OF THE INVENTION

It has been customary to use a fluoride resin, such as polytetrafluoroethylene, which is highly resistant to chemicals and heat, in the piston rings fitted on the pistons which are slidably received in the cylinders of a swash-plate compressor for an automotive air conditioner. Since fluoride resins have a relatively poor wear property, carbon fibers are typically distributed in the fluoride resins to improved their wear properties. The cylinders typically consist of aluminum alloys containing primary crystal silicon particles distributed therein to reduce the tendency of the carbon fibers to attack the cylinder surfaces.

However, in order to have primary crystal silicon to precipitate in an aluminum alloy, the silicon content of the alloy has to be increased and the material cost is thereby increased. Further, primary crystal silicon particles have relatively large diameters in the order of 50 to 500 micrometers and have a high hardness in the order of 1,000 Hv, making the aluminum alloy unsuitable for machining. Due to the tendency of the primary crystal silicon particles to produce cracks in the aluminum alloy and to peel off, a poor surface condition is produced, and the aluminum alloy tends to attack and wear out the other sliding member.

BRIEF SUMMARY OF THE INVENTION

In view of such problems of the prior art, a primary object of the present invention is to provide a combination of sliding members which prevents one of the sliding members from attacking the other and improves the overall wear property.

A second object of the present invention is to provide a combination of sliding members which has a favorable wear property and a low coefficient of friction.

A third object of the present invention is to provide a combination of sliding members which is suitable for use as a combination of a piston ring and a cylinder in a swash-plate compressor for an automotive air conditioner.

These and other objects of the present invention can be accomplished by providing a combination of sliding members, wherein: one of the members consists of an aluminum alloy which contains, at least in its sliding surface, silicone particles consisting of eutectic silicon; and the other sliding member consists of a fluoride resin which contains, at least in its sliding surface, carbon fibers and a calcium compound.

Since one of the sliding members consists of an aluminum alloy in which eutectic silicon particles, which are less hard than primary crystal silicon particles, are distributed, its surface can be finished to a desired smoothness. Also, since a calcium compound which is not harder than carbon fibers but harder than teflon resin is distributed in the teflon resin containing carbon fibers distributed therein, the tendency of the carbon fibers to attack the aluminum alloy is reduced by virtue of the presence of the calcium compound, and the aluminum alloy can achieve a sufficient wear resistance even though it does not contain any primary crystal silicon particles having a high hardness. Furthermore, the calcium compound serves as a favorable lubricant by retaining lubricating oil therein, and reduces friction between the two sliding members. Thus, the present invention can offer a significant advantage in achieving a high wear resistance and a reduced friction at the same time.

Preferably, the other sliding member consists of polytetrafluoroethylene containing, at least in its sliding surface, 5 to 20% by weight of carbon fibers and 1 to 5% by weight of a calcium compound which may consist of calcium carbonate.

In a particularly favorable application of the present invention, the sliding members consist of an inner circumferential surface of a cylinder and a piston ring fitted on a piston which is slidably received in the cylinder, respectively, and the cylinder and the piston form a part of a compressor for an automotive air conditioner.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
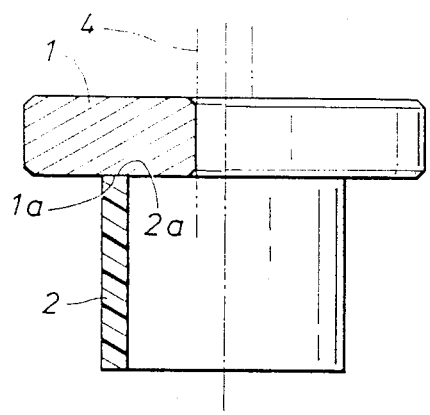
FIG. 1 is a side view, partly in section, of test pieces according to the present invention which were used in the wear tests.
Figure 2:
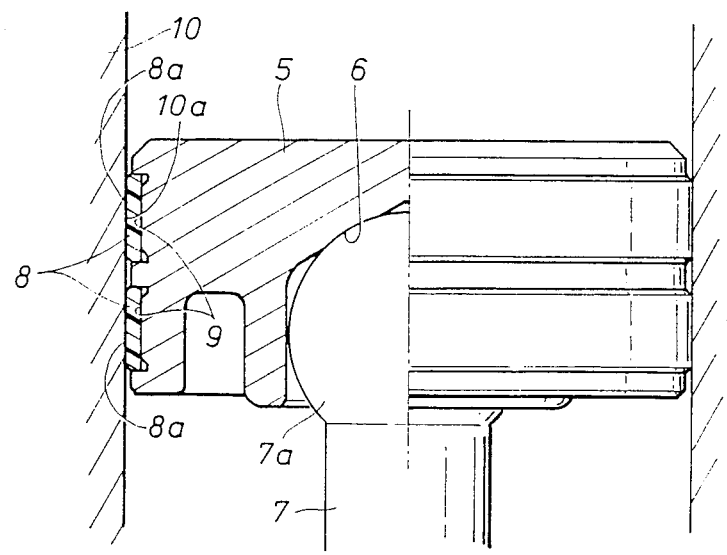
FIG. 2 is a side view, partly in section, of a piston received in a cylinder to which the present invention is applied.

Now the procedure of the wear test conducted on a combination of sliding members according to the present invention is described in the following. One of the sliding members consisted of a disk 1 made of an aluminum alloy containing eutectic silicon particles, and the other sliding member consisted of a sleeve 2 made of polytetrafluoroethylene (which is referred to as teflon resin hereinafter) containing carbon fibers and a calcium compound.

The material of the disk 1 contained 10.0% by weight of silicon in the form of hard particles solely made of eutectic silicon, 3.0% by weight of copper, 0.25% by weight of magnesium, 0.7% or less by weight of iron, 0.3% or less by weight of manganese, 0.3% or less by weight of nickel, and 0.5% or less by weight of zinc, and was subjected to the T6 heat treatment (solution treatment followed by artificial aging; a notation according to JIS). Its sliding end surface 1a was finished to the surface roughness of 1.6S (surface roughness in micrometers; for details refer to JIS B 0601).

The sleeve 2 contained teflon resin as a matrix, and additionally contained 10% by weight of carbon fibers which are 50 to 300 micrometers in length and 5 to 20 micrometers in diameter, and 3% by weight of calcium carbonate which is 5 to 20 micrometers in particle diameter. Its sliding end surface 2a was surface finished to the surface roughness of 1.6S in the same way as the sliding end surface 1a of the disk 1.

This sleeve 2 was fixed, and a shaft member 4 was fitted into the central hole of the disk 1 as shown by the imaginary line in FIG. 1, and the two sliding end surfaces 1a and 2a were rubbed one another in the environment of lubricating oil at the surface pressure of 10 kg/cm² and at the relative speed of 4.5 m/sec for 24 hours.

When the above described test was completed, the disk 1 was worn by 4 micrometers while the sleeve 2 was worn by 3 micrometers, demonstrating that the combination of the sliding members according to the present invention produces less wear as compared with similar but conventional combinations of sliding members.

Now is described a concrete example in which a combination of sliding members according to the present invention was applied to the cylinder and piston of an axial piston compressor.

A cup-shaped piston 5 receives in its lower central recess 6 a spherical head 7a of a piston rod 7 which is connected to a drive source which is not shown in the drawing. The outer circumferential surface of the piston 5 is provided with a pair of annular grooves 9 receiving a pair of identical piston rings 8, respectively. Each of the piston rings 8 is made of teflon resin containing 5 to 20% by weight of carbon fibers which are 50 to 300 micrometers in length and 5 to 20 micrometers in diameter, and 1 to 5% by weight of calcium carbonate particles which are 5 to 20 micrometers in particle diameter.

If the carbon fiber content is less than 5% by weight, the wear property and the mechanical property will be impaired. Conversely, if the carbon fiber content is greater than 20% by weight, the elongation of the piston ring 8 when mounted on the piston will be reduced, and the coefficient of friction will increase. When the carbon fibers are shorter than 50 micrometers in length, the carbon fibers will become prone to get detached from the teflon matrix. Conversely, if the carbon fibers are longer than 300 micrometers, the distribution of the carbon fibers in the teflon matrix will become uneven, and the effective surface area of the sliding surface will be diminished. If the carbon fibers are thinner than 5 micrometers in diameter, the carbon fibers will tend to break, and the mechanical strength of the piston ring 8 may become insufficient. If the carbon fibers are thicker than 20 micrometers in diameter, the distribution of the carbon fibers will become uneven, and the degree of the attachment between the carbon fibers and the teflon matrix will be impaired.

The cylinder 10 is made of an aluminum alloy in which is distributed 10% by weigh of silicon in the form of hard particles consisting solely of eutectic silicon and less than several tens of micrometers in diameter.

Since eutectic silicon is softer than primary crystal silicon, this aluminum alloy is more suitable for machining allowing the surface roughness of the sliding surface (or the inner circumferential surface of the cylinder 10) to be improved, and the coefficient of friction to be reduced. In conventional materials of this kind, when the teflon resin of the piston ring 8 has worn out and carbon fibers have started to protrude from its surface, the contact pressure between the piston ring and the cylinder surface is locally increased due to the direct contact between the carbon fibers and the cylinder surface, and the carbon fibers demonstrate a tendency to attack the cylinder surface. However, according to the sliding members of the present invention, since calcium carbonate has a hardness which is intermediate between teflon resin and carbon fibers, the sliding members are made less prone to wears, and the excessive local increase in surface pressure is avoided. Furthermore, as calcium carbonate has a capability to retain lubricating oil therein, it can function as a favorable lubricant. Moreover, calcium powder is so fine that it will not be abrasive.

According to a test, using a cylinder 10 having a bore diameter of 31.0 mm and a surface roughness of 12S and a piston ring 8 having an outer circumferential sliding surface which is finished to a surface roughness of 12S, in which the piston 5 was reciprocated in the cylinder to pressurize fleon gas and was lubricated by a paraffin lubricant, the wears of the piston ring 8 and the cylinder 10 were less than 10 micrometers, and were therefore substantially less than those of conventional combinations of friction materials.

Calcium carbonate was distributed in the teflon resin matrix in the above described embodiment, but other compounds such as calcium fluoride may also be distributed in teflon the resin.

Thus, according to the present invention, one of the sliding members consists of an aluminum alloy in which eutectic silicon particles are distributed, and, therefore, its surface can be finished to a desired smoothness. Also, since a calcium compound which is not harder than carbon fibers but harder than teflon resin is distributed in the teflon resin containing carbon fibers distributed therein, the tendency of the carbon fibers to attack the aluminum alloy is reduced by virtue of the presence of the calcium compound, and the aluminum alloy can achieve a sufficient wear resistance even though it does not contain any primary crystal silicon particles having a high hardness. Furthermore, the calcium compound serves as a lubricant, and reduces friction between the two sliding members. Thus, the present invention can offer a significant advantage in achieving a high wear resistance and a reduced friction at the same time.

What we claim is:

1. A combination of sliding members, wherein:
   one of said members consists of an aluminum alloy which contains, at least in its sliding surface, silicone particles consisting of eutectic silicon; and
   the other sliding member consists of a fluoride resin which contains, at least in its sliding surface, carbon fibers and a calcium compound.

2. A combination of sliding members according to claim 1, wherein said other sliding member consists of polytetrafluoroethylene containing, at least in its sliding surface, 5 to 20% by weight of carbon fibers and 1 to 5% by weight of a calcium compound.

3. A combination of sliding members according to claim 1, wherein said calcium compound consists of calcium carbonate.

4. A combination of sliding members according to claim 1, wherein said sliding members consist of an inner circumferential surface of a cylinder and a piston ring fitted on a piston which is slidably received in said cylinder, respectively.

5. A combination of sliding members according to claim 4, wherein said cylinder and said piston form a part of a compressor for an automotive air conditioner.

* * * * *

UNITED STATES PATENT AND TRADEMARK OFFICE
CERTIFICATE OF CORRECTION

PATENT NO. : 4,972,764
DATED : November 27, 1990
INVENTOR(S) : OHYA et al

It is certified that error appears in the above-identified patent and that said Letters Patent is hereby corrected as shown below:

On the title page, item [57], line 4, delete "silicone" and insert therefor --silicon--.

Column 4, claim 1, line 4, delete "cone" and insert therefor --con--.

Signed and Sealed this

Second Day of February, 1993

Attest:

STEPHEN G. KUNIN

Attesting Officer

Acting Commissioner of Patents and Trademarks